Patented Aug. 29, 1933

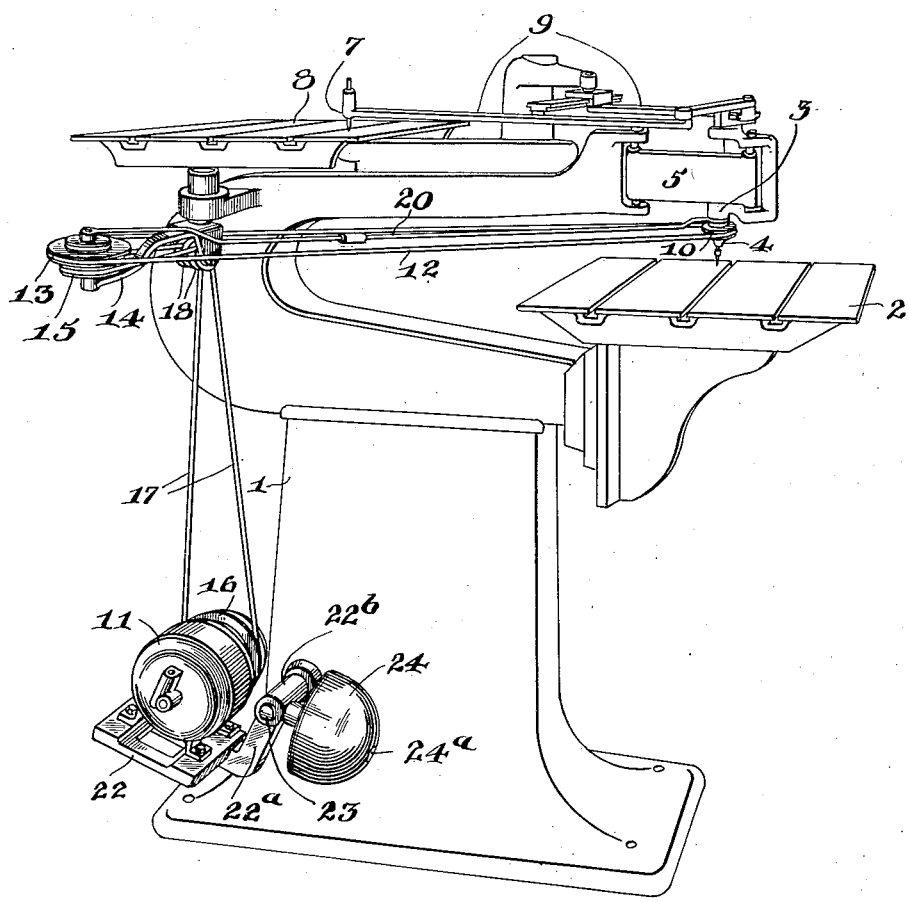

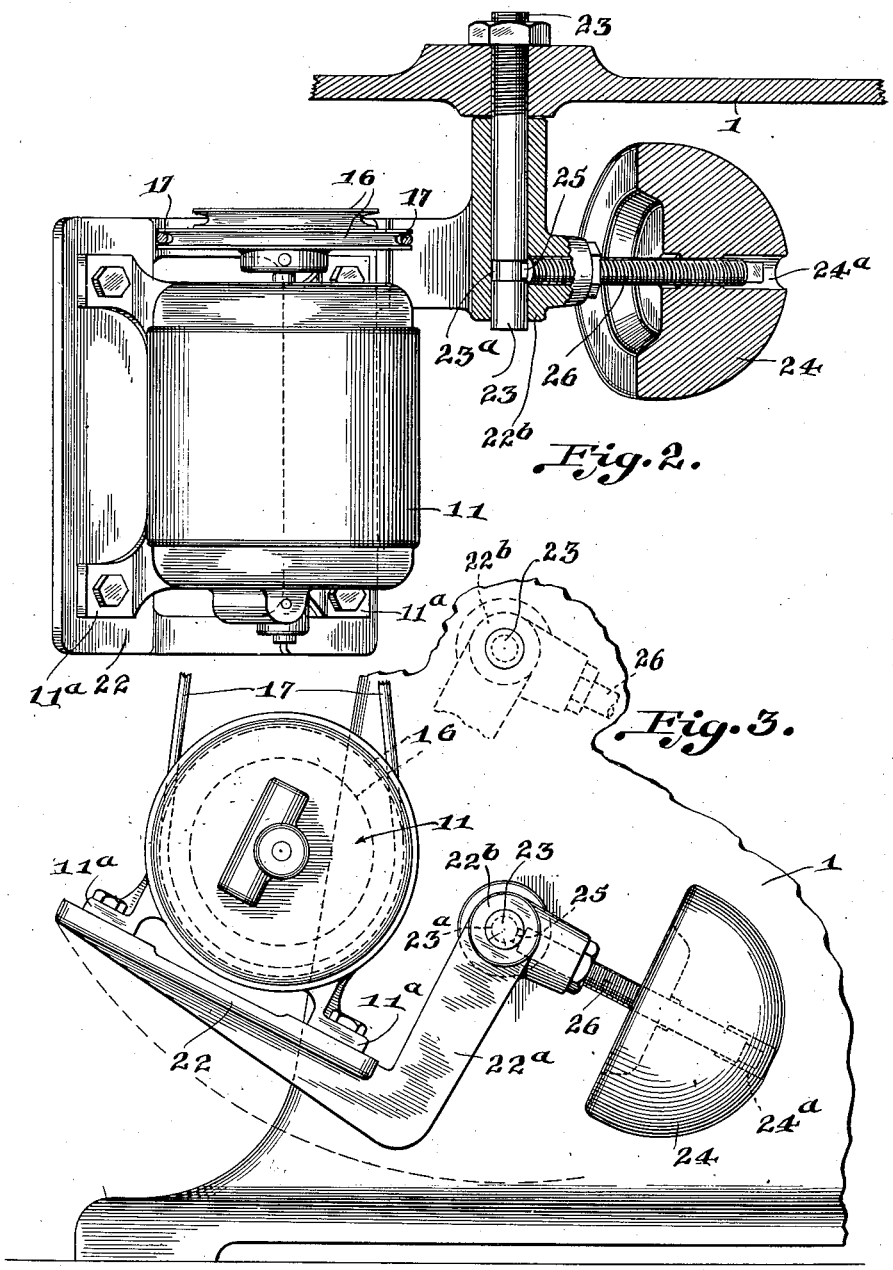

1,925,036

UNITED STATES PATENT OFFICE 1,925,036

ENGRAVING MACHINE AND THE LIKE

George Gorton, Racine, Wis.

Application January 31, 1930. Serial No. 425,047

7 Claims. (Cl. 308—11)

This invention relates to engraving machines that include a drive of the endless belt type for the rotary cutter or other spindle, and, from a specific standpoint, that include a laterally movable pantograph controlled cutter head having the rotary cutter spindle and an endless flexible friction driving belt that is usually jointless and round in cross section; and those skilled in the art will understand the nature and objects of the invention in the light of the following explanation of the accompanying drawings that illustrate what I now believe to be the preferred mechanical expression or embodiment of the invention from among other forms and arrangements within the spirit and scope thereof.

An object of the invention is to render such machines more simple in structure and control and more efficient in rotary cutter action, than heretofore, by improving the cooperative arrangement and coaction of the motor and endless driving belt leading from and driven by the motor.

With the foregoing and other objects in view, my invention consists in certain novel features and in arrangements and combinations as more fully and particularly explained and specified hereinafter.

Referring to the accompanying drawings, forming a part hereof:

Fig. 1 is a perspective of a pantograph engraving machine embodying my invention.

Fig. 2 is a detail top plan, a portion of the machine frame column being shown in section, and a portion of the hub of the motor bracket or carrier being broken away.

Fig. 3 is a detail side elevation of the structure of Fig. 2, dotted lines showing certain hidden parts.

In the drawings, I show a pantograph engraving machine that embodies a supporting frame having a vertical column 1, provided with a base and a rigid super-structure. The work table 2, is supported by this frame, and can be rendered vertically and horizontally adjustable in any suitable manner and by any desirable means.

The engraving machine cutter head 3, is arranged and laterally movable above the work table and the work clamped on that table, and said head 3, carries the vertical spindle 4, mounted to rotate in the head and depending therefrom to receive and drive a suitable rotary cutting tool depending from the spindle for operating on the work on the table 2. The head 3, is supported in any suitable manner from the supporting frame super-structure, as by laterally swingable link 5, to permit free lateral or horizontal movement of the head to carry the rotary cutter to all portions of the area of the work to be operated on by the cutter. The lateral position of said head is controlled and said head is moved laterally by the hand of the operator in causing a stylus 7, to trace the copy or pattern clamped on a pattern support or copy holder 8. The stylus is carried by any suitable pantograph mechanism 9, operatively supported by the superstructure of the machine supporting frame, and operatively coupled to the cutter head 3, to cause the cutter head to follow, in scaled relation, the lateral movements of the stylus, and hence the cutter head is moved laterally by the stylus through the medium of the pantograph mechanism to cause the rotary cutter to reproduce the pattern in scaled relation on the work.

The rotary cutter spindle is provided with and rotated by a belt pulley 10, and this pulley (consequently the cutter spindle) is driven from rotary electric motor 11, through the medium of a suitable endless friction belt drive. In the particular example illustrated, and I do not wish to so limit my invention, an endless belt 12, is driven by pulley 13, rotating on a vertical axis carried by the free end of horizontal swingable arm 14, and extends horizontally therefrom to the spindle pulley 10, to drive the spindle. The pulley 13, is driven by pulley 15, secured to and rotating on the same axis as pulley 13, and hence carried by the free end of arm 14, and pulley 15, is driven by the cone pulley 16, located on and driven by the horizontal rotary motor shaft of motor 11, through the medium of endless friction driving belt 17, fitting and driven by motor pulley 16, and extending vertically therefrom to a pair of inclined idler pulleys 18, carried by and depending from the fulcrumed end of arm 14, and from idlers 18, outwardly and longitudinally of the arm 14, to and fitting pulley 15, to drive the same.

The horizontally swingable arm 14, is hung at its inner end, from an overhanging upper portion of the machine supporting frame, to swing laterally on a vertical axis from which the arm extends laterally or rearwardly. The rear or free end of this arm is operatively connected to the cutter head, through the medium of tension rod 20, by which the head and arm are connected to swing or move laterally together to always maintain a certain fixed relation, although the tension rod is longitudinally adjustable to maintain the desired tension of the belt 12, that drives the cutter spindle.

The driving belt 17, for belt 12, is automatically maintained under the desired power receiving and transmitting tension by the bodily movement of the motor 11, as a unit under the urge of gravity or the equivalent thereof, while maintaining its operative belt driving relation to and with said motor driven belt 17.

This result is accomplished in the particular example illustrated, without desiring to so limit all features of my invention, by providing a freely vertically movable support for the motor, so arranged that the constant tendency of the motor to move bodily in one direction (say downwardly by gravity) is resisted by the endless belt 17, through the medium of the motor pulley 16, located in the bottom bight of said belt 17.

Thus, in the example illustrated for purposes of explanation, the motor 11, rests and is normally clamped, bolted or otherwise fixed down on the upper side of an appropriate motor platform, holder or shelf 22, that is swingable vertically with its load (the motor) from or on a fixed horizontal supporting axis 23, offset from or arranged laterally beyond the adjacent edge of the platform, and this vertically swingable loaded motor support is preferably counter-balanced approximately, by adjustable counter-balance or weight 24, to relieve the belt 17, of excessive weight or load beyond that necessary to maintain automatically the required or desired belt tension.

In the example illustrated, the electric motor 11, is encased or housed in any suitable or usual manner and provided with base feet 11a, resting on the top face of the supporting platform 22, of the motor carrier. The rotary or motor shaft is arranged longitudinally of the motor and the projecting end of this shaft has the motor pulley 16, operatively fixed to and driven by said shaft and arranged exteriorly of and beyond one end of the motor housing.

The axis of rotation of the motor shaft and motor pulley, is in the example shown, parallel with the axis 23, on which the motor carrier oscillates or swings. The axis 23, is offset or arranged laterally to one side of the motor and platform 22, with the counterweight arranged on the opposite side of said axis from the load, i. e. the motor and its supporting platform, to perform its counterbalancing, or approximate counterbalancing, functions. In this example, the platform 22, is rigid with a supporting arm 22a, perpendicular to the general plane of the platform and rising from one side edge thereof, and at its upper end formed with a rigid transverse hub 22b, usually integral with the arm. The bore of this hub receives the axis 23, and is rotatable thereon and provides the supporting bearing of the rockable motor carrier on the axis 23.

The axis 23, supports the motor carrier and its load, and in the example shown, consists of a strong cylindrical stud forming the journal on which the motor carrier hub rotates or oscillates. This stud is horizontal and projects rearwardly from the lower portion of the rear side of the column 1, of the machine frame, and is suitably fixed thereto, as by securing and clamping the threaded inner end of the stud in an appropriate hole in the column wall, or otherwise. The stud, intermediate the length of its cylindrical bearing portion, can be formed with an exterior annular groove 23a, to loosely receive the reduced cylindrical end 25, of the rod or shaft 26, carrying the counterweight 24, for normally locking the hub 22b, against outward movement from the supporting stud 23, while permitting free rotary movement of the hub on the stud. The hub 22b, is formed with an internally screw threaded radial hole or socket that opens into the bore of the hub, and the rod or shaft 26, is exteriorly and longitudinally threaded to screw into said hole to secure the shaft to and normally rigid with the hub and projecting radially therefrom.

The exteriorly circular counterweight 24, is formed with a central longitudinal internally threaded bore 24a, that receives the fixed shaft 26, whereby the counterweight can be rotated by hand to adjust the same longitudinally of the shaft toward and from the axis 23, and whereby the weight will remain in the position to which adjusted. The weight can thus be adjusted to a position to almost counterbalance the combined weight of the platform and motor, and to suit different motors that may be applied to the platform and to increase or decrease the tension applied to the belt 17, as may be desired.

The motor is so located on its supporting platform, preferably, to arrange the motor pulley 16, vertically directly below the vertical axis on which arm 14, swings and directly below the pair of idler pulleys carried by the fulcrumed end of said arm, so that the vertical or depending portion of belt 17, that forms the bight receiving and by which pulley 16, is upheld (and by which the motor and its carrier is restrained or upheld), will extend in approximately a vertical plane between said idler pulleys and the motor pulley 16.

In thus restraining or upholding the motor through its pulley 16, the belt 17, is supported and upheld by said pair of idler pulleys and the pulley 14, located in the bight at the upper outer end of the belt, but the load thus transferred by belt 17, to the swing arm 14, does not interfere with the free swing of said arm with the cutter head on its lateral movements and throws no load or belt pull on the cutter head and the stylus 7, and does not interfere with the tightening of the belt 12, by tension rod 20.

The motor mounting disclosed is exceedingly rugged and durable, economical to produce and maintain, and easily and quickly adjusted by rotating the counterweight to secure accurately just the balance required to attain the belt tension desired. Also, by lifting the platform 22, by hand, the belt can be loosened and quickly slipped from one to the other of the grooves of the cone pulley 16. I find that this combination is exceedingly effective in automatically taking up the slack in the belt 17, when working under more or less severe stress, that ordinarily would cause the belt to loosen and slip on its pulleys.

Engraving machine rotary cutter spindle driving motors are ordinarily comparatively light in weight and of comparatively small horse power, say about one horse power, but usually less than one horse power.

In comparatively small low-down machines, I have generally located the stud or axis 23, at an elevation above the floor or above the base of column 1, about as shown, allowing ample space for operative vertical swing of the motor carrier, above and out of contact with the base or floor. In the event of breakage of belt 17, the carrier can, when so located, drop without objectionable or damaging shock onto the floor or base, particularly as in such machines, the carrier and its load, are usually counterbalanced to provide a differential or over load of the motor end of the carrier to cause a down pull on the belt of, say, only about four or five pounds. However, if so desired, the motor carrier can be located outwardly from the column 1, by outwardly elongating the master or supporting axis 23, so as not to drop onto the column base, in the event of belt breakage. Also, if so desired, the master axis 23, can be fixed sufficiently high on the column 1, see dotted lines Fig. 3, to permit the motor carrier to swing down free of and without striking the floor or the column base, in the event of belt breakage, which doubtless is the desirable arrangement in larger machines where a heavier motor is employed.

In the machine illustrated, it is desirable to locate the motor and its carrier out of the way behind the column and it is usually desirable in such machines to locate all possible weight as low down on the column as possible.

My instant invention while peculiarly adapted to engraving machines is not limited thereto and where the term "engraving machine" is employed in the claims I thereby mean any machine to which my invention is applicable and to which it can be adapted, and I do not wish to limit my invention to the disclosures hereof except where required by the following claims construed in the light of the prior art.

What I claim is:—

1. In combination; a machine frame; a supporting axis projecting horizontally therefrom; a motor platform projecting laterally from said axis and mounted thereon to swing therefrom in a vertical arcuate path; said platform provided with a longitudinally screw threaded member rigid therewith and projecting laterally with respect to said axis; a rotary counterweight forming a screw threaded nut on and meshing with said member and adjustable longitudinally thereof by rotation; a motor mounted on and carried by said platform and provided with and driving a rotary shaft parallel with said axis and having a concentric belt driving pulley; and a belt drive including an endless friction belt driven by said pulley and fitting thereunder to limit the downward gravity drop of said platform and its load; said weight approximately counterbalancing said platform and its load to control the downward pull of said pulley on said belt.

2. In combination; a support; a fixed bearing stud projecting therefrom and having an annular groove; a motor provided with and driving a pulley; a vertically swingable platform supported by said stud and carrying said motor and provided with an offset hub receiving and rotatable on said stud; an arm normally fixed to said platform and having an end projecting into said stud groove; a counter-weight screwed on and adjustable longitudinally of said arm to approximately counterbalance the weight of the platform and motor; and a belt drive including an endless driving belt fitting under and driven by said pulley and limiting the descent of the motor.

3. In combination, a belt drive that includes a traveling belt providing a depending bight, a freely vertically swingable motor provided with a belt pulley driven thereby and arranged in said bight to drive said belt and whereby said motor is normally held lifted in an elevated position, a support for said motor providing a center about which said motor is concentrically movable vertically, a counter-balancing weight controlling the gravity load of said pulley on said belt bight, said weight being adjustable in either direction by rotation, and a screw threaded connection between said weight and said support whereby said weight is propelled longitudinally when rotated and locked in the position at which rotation ceases.

4. In combination, a belt drive including an endless drive belt providing a vertically-disposed bight, a motor having and adapted to drive a belt pulley located in said bight to drive said belt, a support for said motor including a horizontal axis, said motor being swingable vertically from said axis as a center, said motor being normally upheld in an elevated position by said bight fitting under said pulley, and an accessible rotatable counterbalancing weight for and swingable with said motor to control the gravity load of said motor on said belt, a screw threaded connection being provided between said rotatable weight and said support to longitudinally adjust the weight on the support when the weight is rotated and to hold the same at the position to which moved, said motor being accessible for manual lifting to slacken said belt for shifting and being free when released from said belt to drop by gravity around said axis as a center.

5. In combination, a machine pedestal having a fixed free-end stud projecting laterally and exteriorly from an elevated portion thereof, a motor carrying and counterbalancing unit normally supported by and vertically rockable on said stud, said unit being bodily removable from and applicable to said fixed stud longitudinally thereof, and a belt drive including an endless belt providing a vertically disposed bight, said unit including a motor having a belt driving pulley normally fitting in said bight and upheld thereby in an elevated position, and adjustable means to control the gravity load of said unit on said belt.

6. In combination, a machine pedestal having an elevated free-end laterally projecting fixed stud, a belt drive including a belt providing a depending bight, a vertically-swingable motor carrying and counterbalancing unit including a motor platform, an intermediate transverse supporting hub, a counter weight carrier, a counter weight adjustable longitudinally of said carrier, and a motor normally fixed to said platform and provided with a belt driving pulley normally fitted in said bight and exerting a gravity load thereon, said hub being located and rotatable on said stud and supporting the unit therefrom, said unit being bodily removable from and applicable to said stud longitudinally thereof over its free end.

7. In combination, a belt drive including a driving belt providing a depending bight, an elevated horizontal supporting axis, and an approximately counterbalanced motor carrier hung from and freely swingable vertically on said axis as a center and provided with a motor carried vertically thereby in a path concentric with said axis, said motor having a belt driving pulley fitted in said bight whereby the belt carries the gravity load of the motor and holds the same elevated, said motor carrier being exteriorly exposed and accessible for lifting to slacken said belt, said carrier including a supporting portion arranged approximately radially of said axis provided with an elevated supporting hub rotatable on said axis and a depressed outwardly projecting platform on which said motor is normally fixed and held depressed with respect to said hub.

GEORGE GORTON.